(12) United States Patent
Mondello et al.

(10) Patent No.: US 11,056,192 B2
(45) Date of Patent: Jul. 6, 2021

(54) MONOTONIC COUNTERS IN MEMORIES

(71) Applicant: Micron Technology, Inc., Boise, ID (US)

(72) Inventors: Antonino Mondello, Messina (IT); Francesco Tomaiuolo, Acireale (IT); Carmelo Condemi, San Giovanni la Punta (IT); Tommaso Zerilli, Mascalucia (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/229,609

(22) Filed: Dec. 21, 2018

(65) Prior Publication Data

US 2020/0202944 A1 Jun. 25, 2020

(51) Int. Cl.

| G11C 16/10 | (2006.01) |
|---|---|
| G11C 16/16 | (2006.01) |
| G06F 11/08 | (2006.01) |
| H03K 21/40 | (2006.01) |
| G11C 16/34 | (2006.01) |

(52) U.S. Cl.
CPC ........... *G11C 16/105* (2013.01); *G06F 11/08* (2013.01); *G11C 16/16* (2013.01); *G11C 16/3436* (2013.01); *H03K 21/403* (2013.01); *G06F 2212/202* (2013.01)

(58) Field of Classification Search
CPC ... G11C 16/105; G11C 16/16; G11C 16/3436; G11C 16/0483; G11C 16/3495; G11C 11/5628; G11C 16/20; G11C 16/10; G11C 16/34; G06F 11/08; G06F 2212/202; H03K 21/403; H03K 21/40

USPC ......................................................... 711/103
See application file for complete search history.

(56) References Cited

U.S. PATENT DOCUMENTS

| 6,687,325 | B1 * | 2/2004 | Wells | H03K 21/403 365/236 |
|---|---|---|---|---|
| 6,836,853 | B1 * | 12/2004 | Dover | H03K 21/403 377/107 |
| 7,483,300 | B2 | 1/2009 | Malhi et al. | |
| 9,153,331 | B2 * | 10/2015 | D'Abreu | G11C 16/16 |

(Continued)

FOREIGN PATENT DOCUMENTS

KR 10-2011-0048494 A 5/2011

OTHER PUBLICATIONS

V. Salapura, K. Ganesan, A. Gara, M. Gschwind, J. C. Sexton and R. E. Walkup, "Next-Generation Performance Counters: Towards Monitoring Over Thousand Concurrent Events," ISPASS 2008—IEEE International Symposium on Performance Analysis of Systems and software, Austin, TX, USA, 2008, pp. 139-146.*

(Continued)

*Primary Examiner* — Pierre Miche Bataille
(74) *Attorney, Agent, or Firm* — Brooks, Cameron & Huebsch, PLLC

(57) ABSTRACT

An apparatus, such as a memory (e.g., a NAND memory), can have a controller, a volatile counter coupled to the controller, and a non-volatile memory array coupled to the controller. The controller can be configured to write information, other than a count of the counter, in the array each time the count of the counter has been incremented by a particular number of increments. Counts can be monotonic, non-volatile, and power-loss tolerant.

26 Claims, 4 Drawing Sheets

(56) References Cited

U.S. PATENT DOCUMENTS

| | | | |
|---|---|---|---|
| 2012/0121060 A1* | 5/2012 | Melton | H03K 21/38 377/44 |
| 2012/0224431 A1 | 9/2012 | Lee et al. | |
| 2014/0184266 A1* | 7/2014 | Krimon | H03K 19/003 326/8 |
| 2015/0074427 A1* | 3/2015 | Lewis | H04L 9/0894 713/193 |
| 2015/0179254 A1 | 6/2015 | Alrod et al. | |
| 2017/0271020 A1 | 9/2017 | Zeng et al. | |
| 2018/0175864 A1 | 6/2018 | Walrant et al. | |
| 2018/0301183 A1 | 10/2018 | Bacchus et al. | |
| 2020/0042465 A1* | 2/2020 | Duval | G06F 21/64 |

OTHER PUBLICATIONS

N. Hua, J. J. Xu, B. Lin and H. C. Zhao, "BRICK: A Novel Exact Active Statistics Counter Architecture," in IEEE/ACM Transactions on Networking, vol. 19, No. 3, pp. 670-682, Jun. 2011.*

International Search Report and Written Opinion from related international application No. PCT/US2019/056028, dated Feb. 4, 2020, 11 pages.

Office Action from related Taiwan patent application No. 108136988, dated Aug. 20, 2020, 8 pages.

* cited by examiner

… (1)

MONOTONIC COUNTERS IN MEMORIES

TECHNICAL FIELD

The present disclosure relates generally to memories, and more particularly, to monotonic counters in memories.

BACKGROUND

Memory systems may be implemented in electronic systems, such as computers, cell phones, hand-held electronic devices, etc. Some memory systems, such as solid state drives (SSDs), embedded Multi-Media Controller (eMMC) devices, Universal Flash Storage (UFS) devices, and the like, may include non-volatile storage memories for storing host (e.g., user) data from a host. Non-volatile storage memories provide persistent data by retaining stored data when not powered and may include NAND flash memory, NOR flash memory, read only memory (ROM), Electrically Erasable Programmable ROM (EEPROM), Erasable Programmable ROM (EPROM), and resistance variable memory, such as phase change random access memory (PCRAM), three-dimensional cross-point memory (e.g., 3D XPoint), resistive random access memory (RRAM), ferroelectric random access memory (FeRAM), magnetoresistive random access memory (MRAM), and programmable conductive memory, among other types of memory.

In some examples, memories can store secure information and can be susceptible to malicious attacks aimed at getting at the secure information. For example, some secure memories can fall victim to replay attacks. Replay, for example, can be the malicious or fraudulent repeat or delay of secure information and can involve intercepting and retransmitting the secure information.

DETAILED DESCRIPTION

Figure 1:
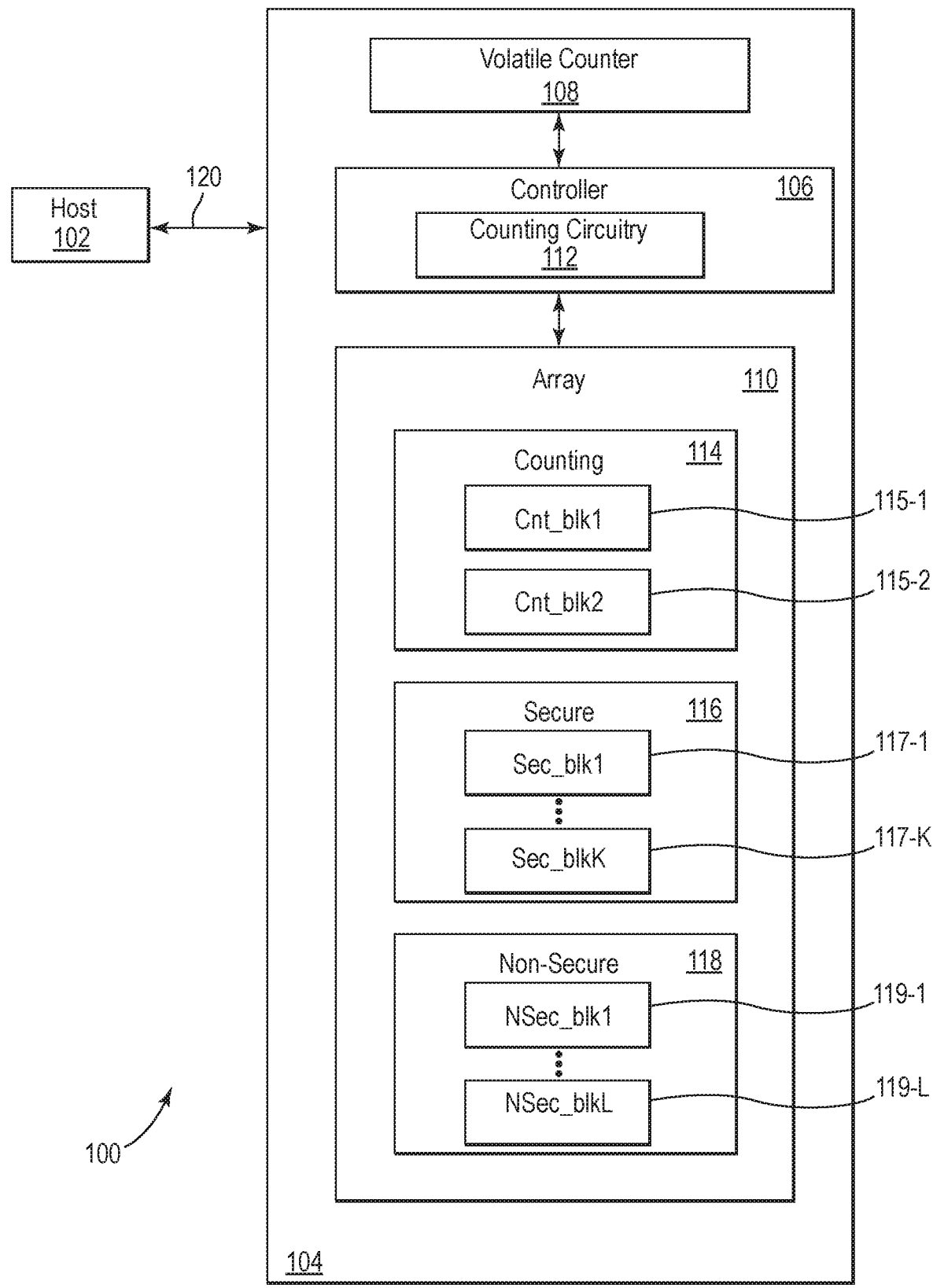
FIG. 1 is a block diagram of an apparatus that can perform monotonic counting operations in accordance with a number of embodiments of the present disclosure.

An example apparatus, such as a memory (e.g., a NAND memory), can have a controller, a volatile counter coupled to the controller, and a non-volatile memory array coupled to the controller. The controller can be configured to write information, other than a count of the counter, in the array each time the count of the counter has been incremented by a particular number of increments. Writing the information to the array after a particular number of increments can reduce the number of writes to the memory array and can thus mitigate the degradation of the memory array that can occur when writing each count to the array as can be done in previous approaches.

The information can include a relatively large number of repeated bits that can provide a relatively high level of redundancy that can compensate for the relatively high bit error rates associated with some non-volatile memories, such as NAND memories. For example, it might not be possible to use error correction code (ECC) schemes for counting operations, and the relatively high level of redundancy can compensate for this. For example, reading the cells without ECC can result in a considerable amount of read disturb to adjacent cells during a read. The redundancy associated with the repeated bits can help compensate for this.

Since the volatile counter loses its count each time the memory is powered down, the counter can be initialized at the next power up (e.g., power-up sequence) to an initialization count that can be greater than or equal to the count on the counter at the time of the power down to ensure, for example, that the count is monotonically increasing. During the power up, the initialization count can be computed by multiplying the number of writes of the information up to the time of the power down by the particular number of increments. The volatile counter can then resume counting by incrementing the initialization count.

In some examples, to ensure there is sufficient storage capacity for the information, the information can be written to one of two blocks. The blocks can be swapped one for the other in response to one of the blocks being full. The full block can be erased so that it is available for the next swap. This, for example, can provide a large counting range compared to previous approaches.

The disclosed embodiments can guard against power losses, such as lost counts that can occur as a result of such power losses. For example, the disclosed embodiments can help ensure a monotonically increasing count (e.g., a power-loss tolerant count) regardless of whether a power loss occurs.

The disclosed monotonic counters can be used to implement "freshness" in secure systems, such as secure memory systems, (e.g., based on symmetric and/or asymmetric cryptography). The monotonic count generated by the disclosed monotonic counters can be a freshness indicator that can be compared to a corresponding freshness indicator embedded in secure information, such as a secure command, to determine the freshness of the information. This can guard against (e.g., eliminate) the possibility of replay.

FIG. 1 is a block diagram of an apparatus in the form of a computing system 100 that can perform monotonic counting operations in accordance with a number of embodiments of the present disclosure. Computing system 100 can include a host 102 and an apparatus in the form of a memory 104 (e.g., a memory device), such as a NAND memory.

Memory 104 can be configured to implement monotonic counting operations and can generate a monotonically increasing count in response to an event, such as receiving a secure command from host 102, for example. Secure commands can refer to commands received from host 102 that require authentication, for example. In some examples, a secure command can include an operation code, a signature, and a freshness indicator. In contrast, non-secure commands might not require authentication, and thus might not include a signature or a freshness indicator.

Memory 104 can include a controller 106, a volatile counter 108 coupled to controller 106, and a non-volatile memory array 110 (e.g. a NAND memory array) coupled to controller 106. Controller 106 can include counting circuitry 112 that can configure controller 106 to perform the various operations associated with the monotonic counting described herein. As used herein, memory 104, controller 106, volatile counter 108, and/or non-volatile memory array 110 can be separately considered an "apparatus."

Array 110 can include blocks of memory cells, such as blocks 115-1, 115-2, 117-1 to 117-K, and 119-1 to 119-L, each of which can be independently programmed and independently and commonly erased. Array 110 can include a dedicated counting section 114, such as a partition, having blocks 115-1 and 115-2 respectively as count blocks Cnt_blk1 and Cnt_blk2. For example, counting section 114, counting circuitry 112, and volatile counter 108 in combination can be an apparatus in the form of a monotonic counter in accordance with a number of embodiments of the present disclosure.

Counting circuitry 112 can be configured to write information, other than a count of volatile counter 108, in counting section 114 each time the count of volatile counter 108 has been incremented by a particular number of increments, as described further herein. During each power up of memory 104, and thus volatile counter 108, counting circuitry 112 can compute the initialization count by multiplying a number of writes of the information to counting section 114 up to the power up by the particular number of increments. Counting circuitry 112 can then initialize counter 108 with the initialization count and begin counting from the initialization count.

Blocks 115-1 and 115-2 can be used one at a time during counting and can be swapped one for the other. For example, the information can be written to an active one of the blocks while the other of the blocks is inactive and not being written to. The blocks can be swapped, in response to the active block being deemed full of the information, so that the inactive block becomes the active block to which the information is now written, and active block becomes the inactive block to which the information is not written.

Array 110 can also include secure section 116 that can be accessed by secure commands issued by host 102 and that can include blocks 117-1 to 117-K respectively as secure blocks Sec_blk1 to Sec_blkK. Array 110 can include a non-secure section 118 that can be accessed by non-secure commands from host 102 and that can include blocks 119-1 to 119-L respectively as non-secure blocks NSec_blk1 to NSec_blkL.

Counting circuitry 112 can increment the count of volatile counter 108 (e.g., by one) in response to each secure command received from host 102. In some examples, the monotonic count can be a freshness indicator that controller 108 can compare to a count embedded in a secure command from host 102 (e.g. as part of symmetric and/or asymmetric cryptography) to determine the freshness on the secure command. This can guard against (e.g., eliminate) the possibility of replay and can help ensure that each secure command is unique.

Host 102 can be coupled to memory 104 via interface 120 that can include a data bus and that can support various standards and/or comply with various interface types, such as double data rate (DDR), etc. Controller 108 can receive commands, such as secure or non-secure read commands and write commands from host 102. Controller 102 can, for example, receive host data to be written to memory 104 from host 102 via a host interface 120.

Interface 120 can be in the form of a standardized physical interface. For example, interface 120 can be a serial advanced technology attachment (SATA) physical interface, a peripheral component interconnect express (PCIe) physical interface, a universal serial bus (USB) physical interface, or a small computer system interface (SCSI), among other physical connectors and/or interfaces. In general, however, interface 120 can provide an interface for passing control, address, data, and other signals between memory 104 and a host 102 having compatible receptors for interface 120.

Host 102 can be, for example, a host system, such as a personal laptop computer, a desktop computer, a digital camera, a mobile device (e.g., cellular phone), network server, Internet of Things (IoT) enabled device, or a memory card reader, among various other types of hosts. For instance, host 120 can include one or more processors capable of accessing memory 104 over interface 120.

Controller 106 can be included on the same physical device (e.g., the same die) as memory array 110. Alternatively, controller 106 can be included on a separate physical device that is communicatively coupled to the physical device that includes memory array 110. In some examples, components of controller 106 can be spread across multiple physical devices (e.g., some components on the same die as the memory, and some components on a different die, module, or board) as a distributed controller.

Host 102 can include a host controller (not shown in FIG. 1) to communicate with memory 104. The host controller can send commands to memory 104 via interface 120. The host controller can communicate with memory 104 and/or the controller 106 to read, write, and/or erase data, among other operations.

Controller 106 and/or the host controller can include control circuitry and/or logic (e.g., hardware and firmware), such as counting circuitry 112. In an embodiment, controller 106 and/or the host controller can be an application specific integrated circuit (ASIC) coupled to a printed circuit board including a physical interface. Also, memory 104 and/or host 102 can include a buffer of volatile and/or non-volatile memory and a number of registers.

Figure 2A:
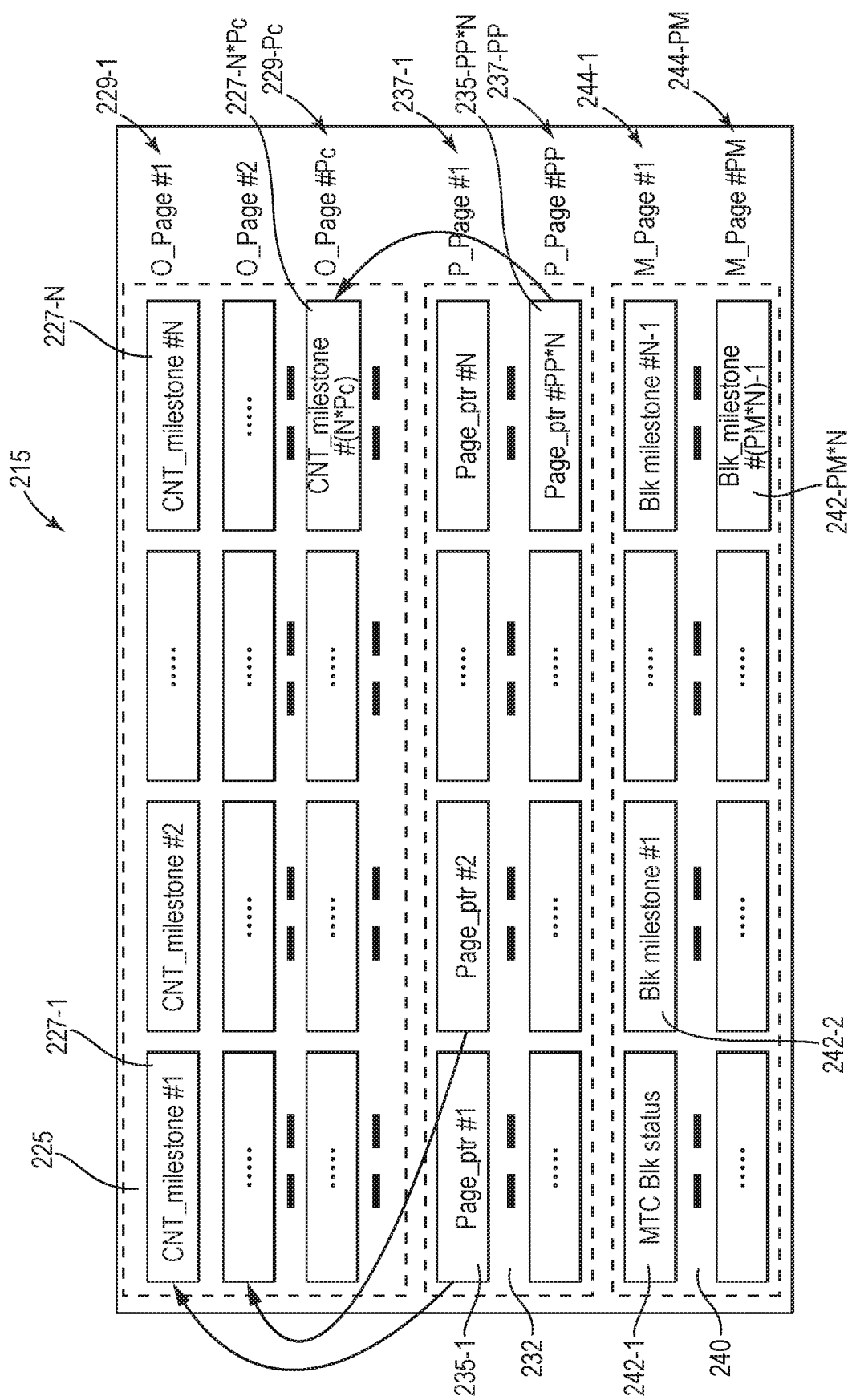
FIG. 2A is a block diagram of a block of memory cells that can facilitate monotonic counting operations in accordance with a number of embodiments of the present disclosure.

FIG. 2A is a block diagram of a block 215 of memory cells that can facilitate counting operations in accordance with a number of embodiments of the present disclosure. For example, each of blocks 115-1 and 115-2 can be block 215. Block 215 can include a region 225 configured to store information, other than the count of volatile counter 108, each time the count of volatile counter 108 has been incremented by a particular number (NC) of increments. Such information can be referred to as a count-milestone record. For example, each respective count-milestone record can correspond to a respective write that occurs each time the count of volatile counter 108 has been incremented by NC increments. As such, there can be one count-milestone record per NC increments of counter 108. For example, there can be NC increments of counter 108 per count-milestone record, and thus per write of a count-milestone record.

Region 225 can include a quantity of segments 227-1 to 227-N*Pc respectively as count-milestone fields CNT_milestone #1 to CNT_milestone #N*Pc. Note that the symbol "*" between two terms signifies multiplication of one of the terms by the other. Each count-milestone field can store a count-milestone record. There can be Pc groups 229-1 to 229-Pc of count-milestone fields in section 225 with N count-milestone fields in each group. Each of groups 229-1 to 229-Pc can be a page of block 215. For example, groups 229-1 to 229-Pc can respectively be pages O_Page #1 to O_Page #Pc.

In some examples, block 215 can include a region 232 configured to store pointer records, such as page-pointer records. Section 232 can include a quantity of segments 235-1 to 235-PP*N respectively as page-pointer fields Page_ptr #1 to Page_ptr #PP*N. For example, each page-pointer field can store a page-pointer record. There can be PP groups 237-1 to 237-PP of page-pointer fields in region 232 with N page-pointer fields in each group. Each of groups 237-1 to 237-PP can be a page of block 215. For example, groups 237-1 to 237-PP can respectively be pages P_Page #1 to P_Page #PP. Page-pointer fields Page_ptr #1 to Page_ptr #PP*N can respectively point to pages O_Page #1 to O_Page #Pc. For example, the quantity PP*N of page-pointer fields Page_ptr # in region 232 can be equal to the quantity Pc of pages O_Page # in region 225.

The respective page O_Page # of the pages O_Page #1 to O_Page #Pc pointed to by the respective page-pointer field Page_ptr # to which a page-pointer record was last written can be a currently active page O_Page #. For example, the page-pointer field Page_ptr # to which a page-pointer record was last written can point to the currently active page O_Page # of region 225.

Block 215 can include a region 240. Region 240 can include a quantity of segments 242-1 to 242-PM*N. One of the segments 242 (e.g., segment 242-1) can be a block-status field MTC Blk status that can store information that indicates whether block 215 is active or inactive. The remaining segments 242 (e.g., segments 242-2 to 242-PM*N) can be block-milestone fields that can respectively store block-milestone records. For example, segments 242-2 to 242-PM*N can respectively be block-milestone fields Blk milestone #1 to Blk milestone #(PM*N)−1. Note that there can be (PM*N)−1 block-milestone fields.

There can be PM groups 244-1 to 244-PM of segments 242 with N segments 242 in each group. Each of groups 244-1 to 244-PM can be a page of block 215. For example, groups 244-1 to 244-PM can respectively be pages M_Page #1 to M_Page #PM. Note that one of pages M_Page #1 to M_Page #PM (e.g., page M_Page #1) can include the block-status field MTC Blk status and the N−1 block-milestone fields Blk milestone #1 to Blk milestone #N−1, whereas each of the remaining pages of M_Page #1 to M_Page #PM (e.g., pages M_Page #2 to M_Page #PM) can include N block-milestone fields.

A block-milestone record can be written to a respective block-milestone field in a new block (e.g., an inactive block that becomes an active block) in response to the old block (e.g., an active block that becomes an inactive block) being swapped for the new block, as discussed previously. The block swap can occur in response to region 225 being full of count-milestone records. For example, the block swap can occur in response to all of the segments 227 (e.g., all of the count-milestone fields CNT_milestone #) having a count-milestone record.

Moreover, those block-milestone records in the old block at the time of the swap can be transferred to the new block in response to the swap. As such, the quantity of block-milestone records BM in an active block can correspond to the quantity of block swaps up to the last block swap. Note that since each block swap occurs when the region 225 is full, each block-milestone record represents N*PC count-milestone records, and thus NC*N*PC increments of counter 108 per swap, and thus per block-milestone record.

Counting circuitry 112 can determine an initialization count that can be greater than or equal to the count of counter 108 as of the last power down of memory 104. The initialization count can be determined from the active block during the next power up of memory 104 by determining the number of increments of counter 108 as of the last power down of memory 104. The number of increments of counter 108 can include the sum of the number of increments of counter 108 since the last block swap and the number of increments of counter 108 up to the last block swap. The step size of the increment can be any positive integer that allows the count to be increasing.

Counting circuitry 112 can determine the number of increments of counter 108 since the last block swap by counting the number of count-milestone records "n" in region 225 and multiplying n by the number of increments NC per count-milestone record. For example, the number of increments of counter 108 since the last block swap can be n*NC.

Counting circuitry 112 can determine the number of increments of counter 108 up to the last block swap by counting the number of block-milestone records BM in region 240 (e.g., the number of block swaps) and multiplying BM by the number of increments NC*N*PC per block-milestone record. Counting circuitry 112 can then determine the initialization count by adding the number of increments of counter 108 since the last block swap n*NC to the number of increments of counter 108 up to the last block swap BM*NC*N*PC. Therefore, the initialization count can be BM*NC*N*PC+n*NC. As is discussed further herein, the initialization count can be greater than the last count of counter 108 as of the last power down of memory 104 in some instances.

Figure 2B:
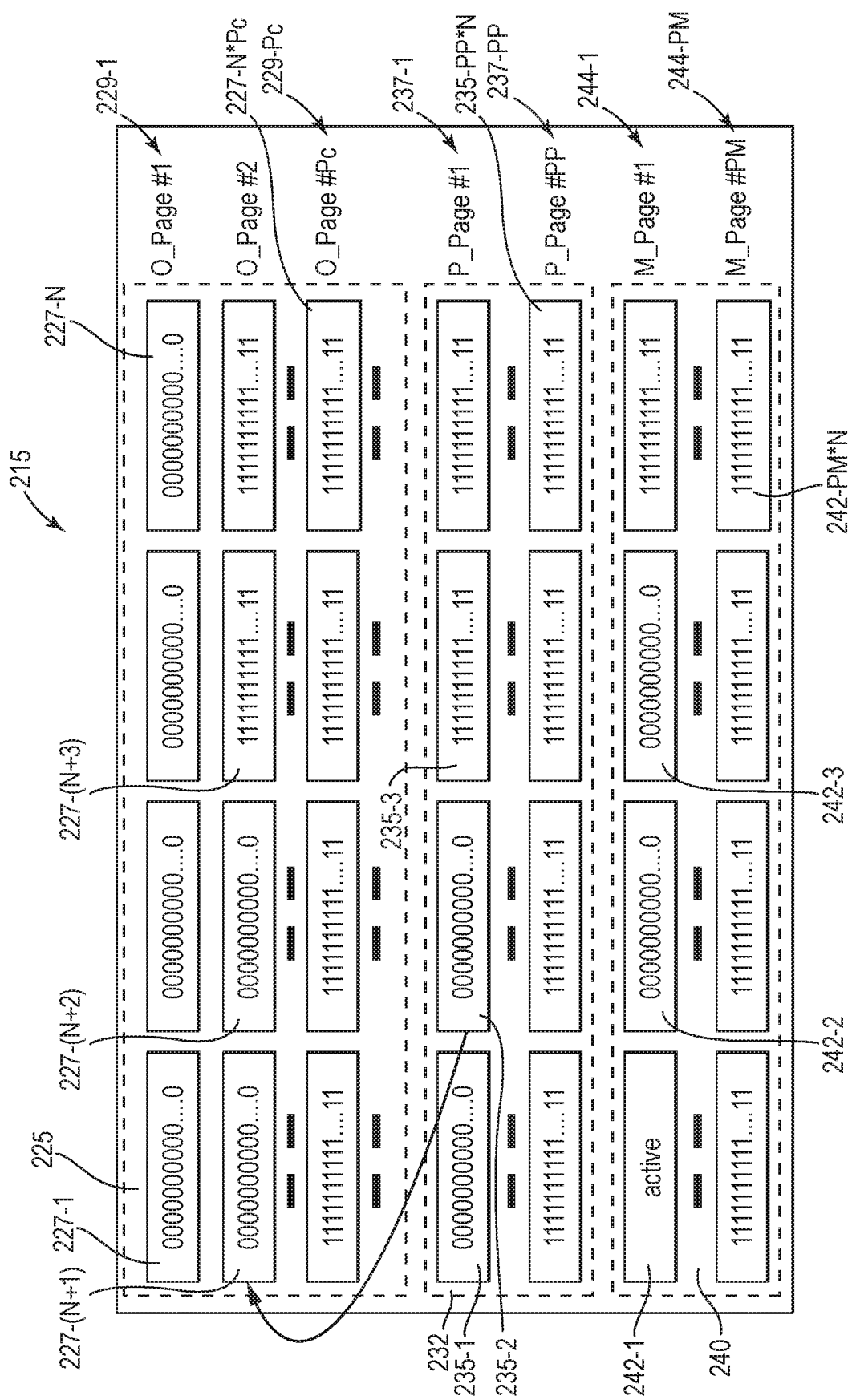
FIG. 2B is a block diagram of a block of memory cells during an example stage of monotonic counting in accordance with a number of embodiments of the present disclosure.

FIG. 2B is a block diagram of a block (e.g., block 215) during an example stage of monotonic counting in accordance with a number of embodiments of the present disclosure. In the example of FIG. 2B, each of the segments 227-1 to 227-N*P that are respectively the count-milestone fields CNT_milestone #1 to CNT_milestone #N*Pc in FIG. 2A can store a data pattern (e.g., bit pattern) of m bits. Similarly, each of the segments 235-1 to 235-PP*N that are respectively the page-pointer fields Page_ptr #1 to Page_ptr #PP*N in FIG. 2A, segment 242-1 that can be the block-status field MTC Blk status in FIG. 2A, and segments 242-2 to 242-PM*N that can respectively be the block-milestone fields Blk milestone #1 to Blk milestone #(PM*N)−1 in FIG. 2A can store a bit pattern of m bits. For example, each respective bit can correspond to a respective memory cell such that each segment 227, 235, and 242 can include "m" non-volatile memory cells.

In some examples, the memory cells can store a single bit per cell and can be programmed to a threshold voltage Vt corresponding to one of two data states, such as data state corresponding to a logical zero (0) or a logical one (1), but the memory cells are not so limited, as is discussed further. The data state corresponding to a logical 1 can be the lowest state of the memory cell, such as an erase state of the memory cell. In some examples, all of the memory cells in each of the segments 227, 235, and 242 in both of blocks 115-1 and 115-2 can be initially erased (e.g., at the factory during production of memory 104). As such, all of the segments 227, 235, and 242 in both of blocks 115-1 and 115-2 can initially have a bit pattern of all (e.g., m) "1s".

In some examples, a bit pattern of all ones in segment 242-1 can indicate that block 215 is inactive. However, the disclosure is not so limited, and other bit patterns can be used to indicate that block 215 is inactive. In some examples, a bit pattern of m/2 zeros followed by m/2 ones (e.g., 000000000 ... 0111111111 ... 1) in segment 242-1 can be referred to as a block-active pattern that can indicate that block 215 is active. However, the present disclosure is not so limited, and other bit patterns can be used for the block-active pattern. For example, the active designation in segment 242-1 in FIG. 2B can correspond to such a block-active pattern, in some examples.

A pattern of all zeros in a segment 227 can be the information that is written to that segment 227 in response to counter 108 being incremented NC times, and thus can be a count-milestone record. In some examples, a pattern of all zeros in a segment 227 can be referred to as a count milestone end pattern (e.g., a count milestone end sequence). A pattern of all ones in a segment 227 indicates that the segment does not contain a count-milestone record and is available to receive a count-milestone record. Note that, in this example, N+2 count-milestone records have been written to block 215 since block 215 was activated. For example, n=N+2. Note that a count-milestone record can be referred to as a count milestone end sequence. For example, the terms count-milestone record and count milestone end sequence can be used interchangeably to refer to the information stored in a segment 227 in response to counter 108 being incremented NC times.

A page O_Page #, such as page O_Page #1, that is full of count-milestone records can be an inactive page of region 225 from the standpoint of writing the next count-milestone record because the page can no longer be written to. A page, such as page O_Page #2, that is partially filled with count-milestone records can be an active page of region 225 from the standpoint of writing the next count-milestone record because at least one additional count-milestone record can be written to that page. Pages in region 225 in which all of the segments have patterns of all ones and that follow a partially written page can also be deemed inactive pages.

Counting circuitry 112 can write a pattern of all zeros to the next available segment 227 (e.g., segment 227-(N+3)) in region 225 in response to counter 108 being incremented by NC times since the pattern of all zeros was written (e.g., to segment 227-(N+2)). Counting circuitry 112 can determine that segment 227-(N+3) is the next available segment by searching region 225 to locate the first segment in region 225 having a pattern of all ones. In some examples, counting circuitry 112 can determine that segment 227-(N+3) is the next available segment by searching the segments 227 in region 225 in ascending order, starting with segment 227-1, to locate the first segment in region 225 having a pattern of all ones. For example, counting circuitry 112 can search each of the segments 227-1 to 227-(N+3) and can write all of the ones in segment 227-(N+3) to zeros by programming each of the memory cells in segment 227-(N+3) to a Vt corresponding to a 0. However, the disclosure is not limited to searching region 225 for a next available segment in ascending order, and, in other examples, region 225 can be searched for the next available segment in descending order.

Alternatively, a count-milestone start pattern (e.g., a count-milestone-start sequence) of m bits can be written to segment 227-(N+3) in response to writing the pattern of all zeros to segment 227-(N+2). The count-milestone-start sequence can be m/2 zeros followed by m/2 ones (e.g., 000000000 . . . 0111111111 . . . 1). Counting circuitry 112 can determine that segment 227-(N+3) is the next available segment by searching each of the segments 227 in ascending order, for example, starting with segment 227-1, to locate the count-milestone-start sequence that identifies segment 227-(N+3) as the next available segment. Counting circuitry 112 can then write all of the ones in segment 227-(N+3) to zero.

A pattern of all zeros in a segment 235 in region 232 can be referred to as a pointer end pattern (e.g., a pointer end sequence) that can be referred to as pointer information. A pattern of all ones in a segment 235 can be referred to as a pointer not-active pattern (e.g., a pointer not-active sequence). In some examples, the last segment in region 232 having all zeros identifies the currently active page in region 225 by pointing to that page. For example, segment 235-2 points to page O-Page #2 and is the last segment in region 232 having all zeros. Therefore, segment 235-2 identifies page O-Page #2 as being the currently active page in region 225.

Instead of segment 235-2 storing the pointer end pattern when pointing to active page O-Page #2, in some examples, segment 235-2 can store information, such as a pointer-active pattern, to indicate that segment 235-2 is active and pointing to page O-Page #2. For example, a pointer-active pattern can be a bit pattern of m/2 zeros followed by m/2 ones (e.g., 000000000 . . . 0111111111 . . . 1). The pointer-active pattern in segment 235-2 can be transformed to the pointer end pattern in response to all of the segments in page O-Page #2 having a count-milestone record (e.g., page O-Page #2 being full). The pointer-active pattern can then be written to next segment, segment 235-3, to indicate that segment 235-3 is active and pointing to the next page O-Page #.

To locate segment 227-(N+3) in page O-Page #2, counting circuitry 112 can search region 232 to locate segment 235-2, and thereby identify page O-Page #2 as the currently active page in region 225. In some examples, counting circuitry 112 can search segments 235 in ascending order, starting with segment 235-1, to locate segment 235-2. However, the disclosure is not limited to searching region 232 in ascending order, and, in other examples, segments 235 can be searched in descending order to locate segment 235-2. Counting circuitry 112 can then just search the segments 227-(N+1) to 227-(N+3) in page O-Page #2 to locate segment 227-(N+3) without searching the segments 227-1 to 227-N in O-Page #1. Counting circuitry 112 can then write all of the ones in segment 227-(N+3) to zeros. Note that searching without the page pointers searched the segments 227-1 to 227-N in O-Page #1 and segments 227-(N+1) to 227-(N+3) in page O-Page #2 to locate segment 227-(N+3). As such the page pointer can reduce the amount of searching.

A pattern of all zeros in a respective segment of the segments 242-2 to 242-PM*N in region 240 can be the information that is written to the respective segment in response to a block swap and can be a block-milestone record. For example, segments 242-2 and 242-3 each store a block-milestone record. This means that the number block-milestone records (e.g., the number of block swaps) BM is two (2). In some examples, a block-milestone record can be referred to as a block-milestone-used pattern (e.g., a block-milestone used sequence). For example, the terms block-milestone record and block-milestone-used pattern can be used interchangeably to refer to a pattern of all zeros in region 240.

A pattern of all ones in any of the segments 242-2 to 242-PM*N can indicate that the segments do not contain a block-milestone record and are available to receive a block-milestone record. For example, a pattern of all ones in any of the segments 242-2 to 242-PM*N can be referred to as a block-milestone-not-used pattern (e.g., a block-milestone-not-used sequence).

In some examples, the block 215 in FIG. 2B may have been swapped for a previously active block. For example, the block-milestone record in segment 242-2 may have been copied from a corresponding segment 242-2 in a region 240 of the previously active block. The block-milestone record copied from the previously active block may have been written to the previously active block as result of that block being swapped for the block 215 in FIG. 2B in a previous swap.

The block-milestone record in segment 242-3 can be written to segment 242-3 in response to the block 215 in FIG. 2B being swapped for the previously active block. The status in segment 242-1 can be updated to indicate that block 215 is currently active in response to the block 215 in FIG. 2B being swapped for the previously active block. After the swap, counting circuitry 112 can erase the previously active block and can update the block status in segment 242-1 in the previously active block to be inactive.

During a power up sequence of memory 104, counting circuitry 112 can determine whether block 215 is active by reading the block-status from segment 242-1. After determining the active block, counting circuitry 112 can determine the initialization count from BM*NC*N*PC+n*NC. For the example of FIG. 2B, BM=2 block-milestone records in region 240, and n=N+2 count-milestone records in region 225. Note that n*NC is the number increments of counter 108 since the last block swap and NC*N*PC is the number of increments of counter 108 per block-milestone record.

In some examples, a count-milestone record can be written in a segment 227 (e.g., segment 227-(N+2)) as part of a power-down sequence for memory 104, regardless of whether counter 108 has been incremented NC times. However, that count-milestone record can still be considered as corresponding to NC increments of counter 108, even though counter 108 has been incremented less that NC increments. In some examples, the count-milestone record can be written in response to the last secure command before the power down of memory 104.

Note that setting the count of counter 108 to the initialization count with n=N+2 during the next power up when it is assumed that the count-milestone record written to segment 227-(N+2) corresponds NC increments of counter 108 when in fact counter 108 has been incremented less the NC increments will result in the initialization count being greater than the count on counter 108 at the last power down.

The various monotonic counters can count BM*NC*N*PC counts. Consider an example with N=128 segments per page, m=128 bits per segment, P=512 pages in block 215, PM=8 pages in region 240, PP=8 pages in region 232, and NC=128 increments per count-milestone record. Then BM=(PM*N)−1=(8*128)−1=1024−1=1023 block-milestone records, and PC=P−PM−PP=512−8−8=496 pages in region 225 available for counting. As such, BM*NC*N*PC=1023*128*128*496=8,313,372,672 counts. Note that this exceeds the count of a 32-bit counter that can count 4,294,697,295 (e.g., $2^{32}-1$) counts. For example, the counter of the preceding example can operate as a 32-bit counter, with the additional available counts allowing for errors and lost counts due to power losses.

As indicated previously, both of blocks 115-1 and 115-2 can be initially erased. Blocks 115-1 and 115-2 can then be initialized. The initialization can be performed in the factory (e.g., by a test machine) or in the field by counting circuitry 112 during the first power up sequence of memory 104. During the initialization, one of the blocks can be initialized and the other block can be left in the erased state with all of its segments having patterns of all ones. Note that the pattern of all ones in segment 242-1, the block-status field, indicates that the block is an inactive block.

During the initialization of a block, a block-active pattern can be written in the first segment in region 240 (e.g., in segment 242-1); a count-milestone-start sequence can be written in the first segment in region 225 (e.g., in segment 227-1); and a pointer-active pattern can be written in the first segment in region 232 (e.g., in segment 235-1). Note that a block-active pattern, a count-milestone-start sequence, and a pointer-active pattern can have m/2 zeros followed by m/2 ones (e.g., 000000000 . . . 0111111111 . . . 1), as described previously. Each of the remaining segments in regions 225, 232, and 240 can remain in the erased state with a pattern of all ones.

The presence of the block-active pattern in segment 242-1 can indicate that the block is active. The presence of the pointer-active pattern in segment 235-1 can indicate that the pointer corresponding to segment 235-1 is active and that the pointer is pointing the active page O_Page #1 whose first segment 242-1 has the count-milestone-start sequence.

In some examples, during a power-up sequence of memory 104, counting circuitry 112 determines which block is active by searching regions 240 in the respective blocks to determine which block has the block-active pattern in its segment 242-1. Counting circuitry 112 determines that the block with the block-active pattern is the active block. However, if the block-active pattern is not found or if one block has the block-active pattern in its segment 242-1 and the other block has a corrupted pattern in its segment 242-1, counting circuitry 112 determines that a power loss occurred during the last block swap. For example, counting circuitry 112 can erase the block that is to be the active block after the swap and repeat the block swap in response to determining that a power loss occurred during the last block swap to recover the power loss, and thus any lost increments of the count.

If no power loss occurs, counting circuitry 112 can search region 232 of the active block for the segment 235 with the pointer-active pattern to determine which page in region 225 is active. Note that the page pointed to by the segment 235 with the pointer-active pattern is the active page. However, if the pointer-active pattern is not found, but instead a corrupted pattern is found in the last segment 235 in region 232 that is written to, counting circuitry 112 determines that a power loss occurred while writing to the last segment.

To recover the power loss, counting circuitry 112 can write a pointer end sequence of all zeros to the segment that had the corrupted pattern and can write a pointer-active pattern to the next segment that points to the next page in region 225 after the page pointed to by the segment that had the corrupted pattern. This can cause the page pointed to by the segment that had the corrupted pattern to be lost for storing count-milestone records. However, counting circuitry 112 can treat the lost page as a full page having N count-milestone records when determining the count of counter 108 so that the count is monotonically increasing.

If no power loss occurs while writing to region 232, counting circuitry 112 can search the active page in region 225 for the last segment having a count milestone end sequence (e.g., segment 227-(N+2) in FIG. 2B) and can determine that segment as having the last count-milestone record in use. However, if counting circuitry 112, instead, finds a segment with a start sequence or a corrupted pattern, counting circuitry 112 can determine that a power loss occurred while the counter 108 was counting data since a count-milestone record was stored in the preceding segment and/or was writing the count-milestone record in the segment with the corrupted pattern. In response to determining that a power loss occurred, counting circuitry 112 can recover the power loss by writing a count milestone end sequence in the segment with the start sequence or corrupted pattern and can write a count-milestone-start sequence to the next segment in region 225.

During a power-up sequence, a count-milestone-start sequence can be written in the next available segment 227 in region 225, and counter 108 can be incremented from the initialization count in response to the first secure command being received at memory 104 after power up. For example, the count-milestone-start sequence can be written to the next segment 227 having a pattern of all ones, such as segment 227-(N+3) in FIG. 2B.

Counter 108 can be incremented by one in response to each received secure command so that the value of the count is the initialization count plus MT, with MT being the number of increments of counter 108 since the power up. Note that the count can be used as the freshness that can be compared to the freshness (e.g., a count) embedded in a secure command to guard against a replay attack, for example.

A count-milestone record can be written to the segment 227 having the count-milestone-start sequence by transforming (e.g., converting) the count-milestone-start sequence to a count milestone end sequence (e.g., a count-milestone record), for example, a pattern with all zeros, in response to MT becoming equal to NC (e.g., in response to counter being incremented NC times). For examples in which the start sequence contains m/2 zeros followed by m/2 ones, programming the ones to zeros can accomplish this. The count-milestone-start sequence can be written to the next segment 227 having all ones in region 225 in response to writing the count milestone end sequence to the previous segment 227.

In response to a page in region 225 becoming full, a pointer end sequence (e.g., having a pattern of all zeros) can be written to the current segment 235 in region 232 pointing to that page. For examples for which the current segment 235 has a pointer active sequence that contains m/2 zeros followed by m/2 ones, programming the ones to zeros can accomplish this. A pointer active sequence can then be written to the next segment 235 in region 232 to point to the next page in region 225.

If there are no pages available in region 225 of the currently active block, for example, if all of the segments in region 225 of the currently active block store a count milestone end sequence so that region 225 is full, a block swap sequence is performed to swap the currently active block with a currently inactive block. For example, the block swap sequence can be performed in response to all of the segments in region 225 having a count milestone end sequence and all of the segments in region 232, in some examples, having a pointer end sequence.

In some examples, the currently active block that is to become an inactive block as a result of the swap can be referred to as a source block, and the currently erased inactive block that is to become the active block as a result of the swap can be referred to as a target block. The swap sequence can include copying region 240 from the source block to the region 240 of target block in response to determining that region 225 is full. For example, segments 242-2 to **242-PM*N in the source block can be respectively copied to segments 242-2 to 242-PM*N in the target block. Note that the block-milestone-used patterns (e.g., block-milestone records) in segments 242-2 and 242-3 in the source block (see FIG. 2B) can be respectively copied to segments 242-2 and 242-3** in the target block.

A block-milestone-used pattern can then be written to the first segment 242 of the segments 242-2 to **242-PM*N in region 240 of the target block having a block milestone not used pattern (e.g., a pattern of all ones) in response to determining that region 225 of the source block is full. For example, a block-milestone-used pattern can be written to a segment 242-4 in the target block, and a count-milestone-start sequence can be written in the first segment (e.g., segment 227-1) of region 225 of the target block in response to determining that region 225 of the source block is full. A pointer-active pattern can be written in the first segment (e.g., segment 235-1) of region 232 of the target block in response to determining that region 225** of the source block is full.

A transient pattern, such as a block-swap-ongoing pattern, can be written in segment 242-1 of the source block in response to determining that region 225 of the source block is full. For example, the block-swap-ongoing pattern can be a pattern of m/2 zeros followed by m/4 ones followed by m/4 zeros (e.g., 000000000 ... 01111 ... 10000 ... 0). However, the present disclosure is not so limited, and other bit patterns can be used for the block-swap-ongoing pattern. The target block can be initialized (e.g., activated) by writing a block-active pattern to in segment 242-1 of the target block.

In some examples, if counting circuitry 112 detects the block-swap-ongoing pattern in the source block during a power up sequence of memory 104, counting circuitry 112 can determine that a power loss occurred during the block swap. In response to determining that a power loss occurred during the block swap, counting circuitry 112 can erase the target block and repeat the block swap sequence. If no power loss occurs, the source block can then be erased so that it is available for the next swap. Note that the erasure makes the source block the inactive block.

Repeating the ones and zeros in the various patterns a relatively large number of times (e.g., m can be greater than or equal to 128) can provide a relatively high level of redundancy that can compensate for the relatively high bit error rates associated with some non-volatile memories, such as NAND memories.

Note that when writing the ones to zeros errors can occur, and all of the ones might not be written to zeros. For example, there can be random ones in a pattern of zeros. In such cases, for example, counting circuitry 112 can count the ones in the pattern. If the number of ones is less than or equal to a threshold quantity, counting circuitry 112 can disregard the ones and deem that all of the ones have be programmed to zeros.

Figure 3:
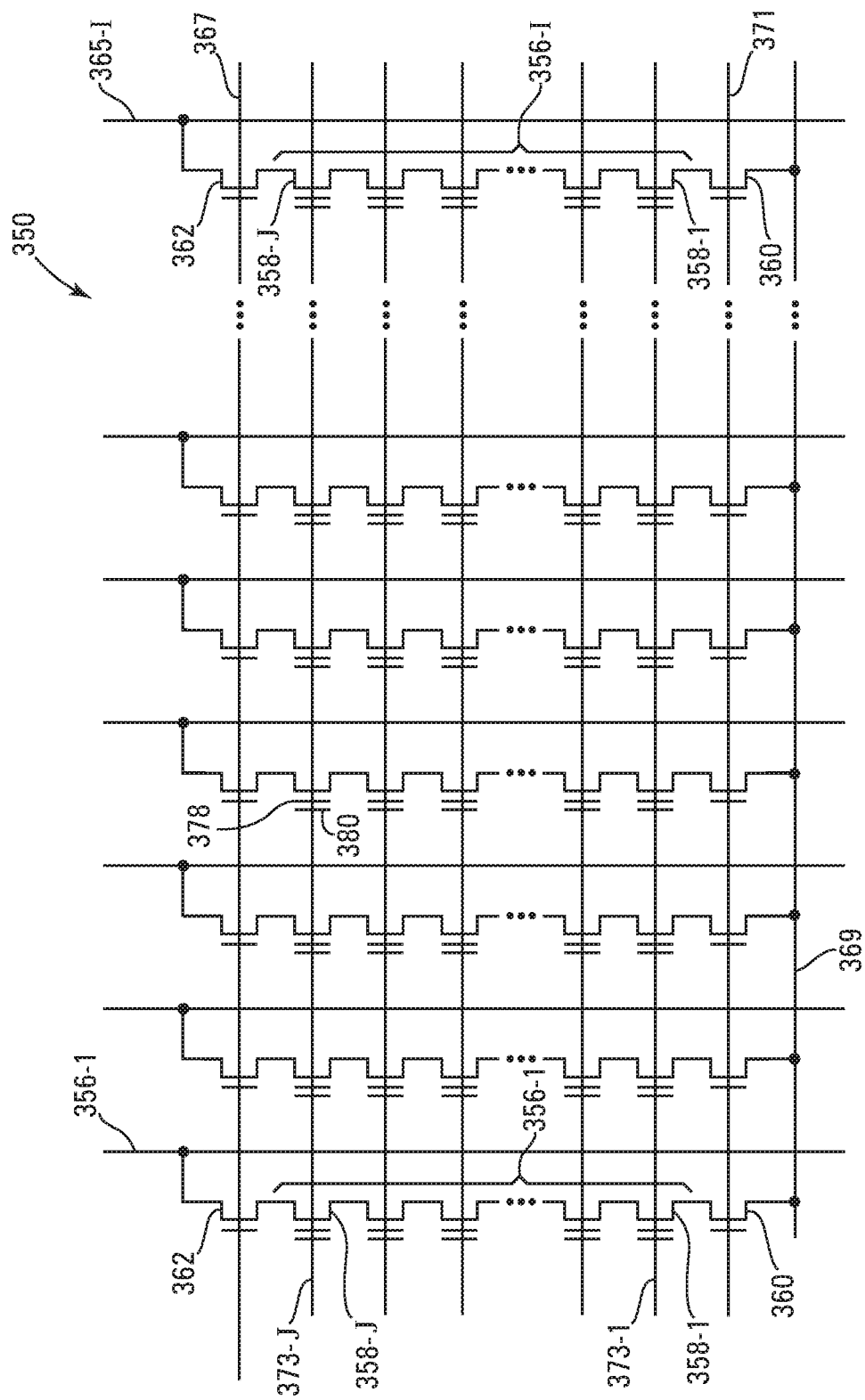
FIG. 3 is a schematic diagram of a block of memory cells in accordance with a number of embodiments of the disclosure.

FIG. 3 is a schematic diagram of a block 350 of non-volatile memory cells that can be the various blocks (e.g., blocks 115-1, 115-2, or 215) disclosed herein in accordance with a number of embodiments of the disclosure. For example, block 350 can be a NAND block.

Block 350 includes groups (e.g., NAND strings 356-1 to 356-I) of series-coupled memory cells. Each of NAND strings 356-1 to 3564 can include memory cells 358-1 to 358-J coupled in series between a select transistor 360 and a select transistor 362. NAND strings 356-1 to 3564 can be respectively selectively coupled to data lines 365-1 to 3654 (e.g., bit lines) by the respective select transistors 362 in response to an activation signal being applied to a select line 367 commonly coupled to the gates of select transistors 362. NAND strings 356-1 to 356-I can be selectively coupled to a common source 369 by the respective select transistors 360 in response to an activation signal being applied to a select line 371 commonly coupled to the gates of select transistors 360.

Access lines 373-1 to 373-J (e.g., word lines) can be respectively commonly coupled to the control gates of memory cells 358-1 to 358-J. For example, a group of memory cells 358 at a common location in NAND strings 356-1 to 356-N can be commonly coupled to a respective access line 371. In some examples, a group of memory cells commonly coupled to an access line can be a page of memory cells. For example, the respective groups of I memory cells respectively commonly coupled to access lines 373-1 to 373-J can be respective pages of memory cells. As such, there can be J pages of memory cells in block 350, each having I memory cells. However, the present disclosure is not so limited, and various groupings of memory cells commonly coupled to an access line can correspond to a page.

Pc of the J pages of block 350 can be the pages O_Page #1 to O_Page #PC of region 225; PP of the J pages of block 350 can be the pages P_Page #1 to P_Page #PC of region 232; and PM of the J pages of block 350 can be the pages M_Page #1 to M_Page #PC of region 240. As such, J can be Pc+PP+PC. Each of the J pages of block 350 can be divided into N segments with m memory cells in each segment so that each page can include I=m*N memory cells 358.

Each of the memory cells 358 can include a charge storage structure 378, such as a floating gate or a charge trapping layer, among others, and a control gate 380. Changes in Vts of memory cells 358 through programming of charge storage structures 378 can determine the data state of each cell.

Memory cells 358 can store a single bit per cell or multiple bits per cell such as, two bits per cell, three bits per cell, four bits per cell, and so on. A memory cell can be programmed to one of $2^r$ data states, with r being the number of bits per cell. Each data state can correspond to a different Vt distribution, and the memory cell can be programmed to a Vt that can correspond to one of the Vt distributions. For example, for two bits per cell, a memory cell can be programmed to a Vt corresponding to one of four data states 11, 10, 01, and 00, and for one bit per cell, a memory cell can be programmed to a Vt corresponding to one of two data states 0 and 1.

In some examples, block 350 can be a portion of a stacked memory array that can be referred to as a three-dimensional (3D) memory array, such as a three-dimensional NAND memory array. In a stacked memory array, NAND strings 356 can be adjacent to semiconductor structures (e.g., vertical semiconductor pillars), and the memory cells 358 in NAND strings 356 can be at different levels (e.g., vertical levels). The memory cells 358 commonly coupled to an access line 373, such as a page of memory cells, can be at a common level, for example, and may form a level of memory cells, sometimes referred to as a tier of memory cells.

In the preceding detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" or a "quantity of" something can refer to one or more of such things. For example, a number of or a quantity of memory cells can refer to one or more memory cells. A "plurality" of something intends two or more. As used herein, the term "coupled" may include electrically coupled, directly coupled, and/or directly connected with no intervening elements (e.g., by direct physical contact), indirectly coupled and/or connected with intervening elements, or wirelessly coupled. The term coupled may further include two or more elements that co-operate or interact with each other (e.g., as in a cause and effect relationship).

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a controller;
   a volatile counter coupled to the controller; and
   a non-volatile memory array coupled to the controller;
   wherein the controller is configured to write information, other than a count of the counter, in the array each time the count of the counter has been incremented by a particular number of increments; and
   wherein the controller is configured to, at a respective power up of the apparatus:
      compute an initialization count by multiplying a quantity of writes of the information up to the power up by the particular number of increments; and
      initialize the counter with the initialization count.

2. The apparatus of claim 1, wherein the controller is configured to
   write the information to a respective segment of a quantity of segments of the array during each respective write; and
   determine the quantity of writes of the information by counting the segments containing the information.

3. The apparatus of claim 1, wherein the particular number of increments is greater than one.

4. The apparatus of claim 1, wherein the controller is configured to increment the count in response to each secure command that is received by the apparatus.

5. The apparatus of claim 4, wherein the controller is configured to use the count to determine a freshness of the secure command.

6. The apparatus of claim 1, wherein the non-volatile memory array is a NAND memory array.

7. An apparatus, comprising:
   a controller;
   a volatile counter coupled to the controller; and
   a non-volatile memory array coupled to the controller;
   wherein the controller is configured to write information, other than a count of the counter, in the array each time the count of the counter has been incremented by a particular number of increments; and
wherein the array comprises a block comprising:
a plurality of groups of first segments, each respective first segment configured to store the information written during a respective write as respective first information; and
a plurality of second segments, each respective second segment pointing to a respective group of the first segments and configured to store second information to indicate that at least one of the first segments of the respective group of first segments is available to store the respective first information.

8. The apparatus of claim 7, wherein the controller is configured to write the second information to a respective second segment in response to determining that a respective group of first segments pointed to by a preceding second segment is full.

9. The apparatus of claim 8, wherein
the second information comprises a first bit pattern; and
the controller is configured to write a second bit pattern to the preceding second segment in response to determining that the respective group of first segments pointed to by the preceding second segment is full.

10. The apparatus of claim 7, wherein the controller is configured to
locate a second segment to which the second information is last written; and
write the respective first information in a first segment in the respective group of first segments to which the located second segment points.

11. The apparatus of claim 7, wherein the controller is configured to
determine, during a power up of the apparatus, that a power loss occurred while the second information is written to a respective second segment pointing to a respective group of first segments in response to determining, during the power up of the apparatus, that the respective second segment contains corrupted information;
replace the corrupted information with third information; and
program the second information to a second segment following the respective second segment with the third information and pointing to a respective group of first segments following the respective group of first segments pointed to by the respective second segment that contained the corrupted information.

12. The apparatus of claim 7, wherein each of the groups of first segments comprises a page of memory cells of the block of memory cells of the non-volatile memory array.

13. An apparatus, comprising:
a controller;
a volatile counter coupled to the controller; and
a non-volatile memory array coupled to the controller;
wherein the controller is configured to write information, other than a count of the counter, in the array each time the count of the counter has been incremented by a particular number of increments;
wherein the memory array comprises a quantity of segments, each respective segment initially storing a first bit pattern; and
wherein the controller is further configured to:
write a second bit pattern in a particular segment of the quantity of segments initially storing the first bit pattern to indicate that the controller is to write the information to the particular segment a next time the count of the counter has been incremented by the particular quantity of increments; and
write the information to the particular segment by writing a third bit pattern to the particular segment storing the second bit pattern the next time the count of the counter has been incremented by the particular quantity of increments.

14. The apparatus of claim 13, wherein
the first bit pattern comprises a plurality of bits having a first bit value;
the controller is configured to:
write the second bit pattern in the particular segment by writing a portion the plurality of the bits having the first bit value to a second bit value so that the second bit pattern comprises a plurality of bits having the first bit value and a plurality of bits having the second bit value; and
write the information to the particular segment by writing the third bit pattern to the particular segment having the second bit pattern comprises the controller being configured to write the plurality of bits having the first bit value in the second bit pattern to the second bit value.

15. An apparatus, comprising:
a controller;
a volatile counter coupled to the controller; and
first and second blocks of non-volatile memory cells coupled to the controller;
wherein
one of the first and second blocks is configured to have an active status while the other of the first and second blocks has an inactive status;
each of the first and second blocks comprises a first region configured to store a first quantity of count-milestone records and a second region configured to store a second quantity of block-milestone records;
the controller is configured to:
swap the respective statuses of the blocks in response to the first region of the block having the active status having the quantity of count-milestone records
write the block-milestone record in the second region of the block that becomes the block having the active status in response to the swap; and
write the count-milestone record in the first region of the block having the active status each time the count of the counter has been incremented by a particular number of increments.

16. The apparatus of claim 15, wherein the controller is configured to, at a respective power up of the apparatus:
determine a first count contribution by multiplying the particular number of increments by a number of the count-milestone records in the first region of the block having the active status at the respective power up of the apparatus;
determine a second count contribution by multiplying the particular number of increments by the first quantity of the count-milestone records and by a number of the block-milestone records in the second region of the block having the active status at the respective power up of the apparatus;
determine an initialization count by adding the first count contribution to the second count contribution; and
set the volatile counter to the initialization count.

17. The apparatus of claim 15, wherein the controller is configured to transfer an additional block-milestone record previously written, as a result of a previous swap, in the second region of the block that becomes the block having the inactive status to the second region of the block that becomes the block having the active status.

18. The apparatus of claim 15, wherein the controller is configured to, in response to the swap:
write a block-active pattern in the second region of the block that becomes the block having the active status that indicates that the block that becomes the block having the active status is active.

19. The apparatus of claim 15, wherein the controller is configured to
write a block-swap-ongoing pattern indicative of a swap in progress in the second region of the block that becomes the block having the inactive status;
determine, during a power up of the apparatus, that a power loss occurred during the swap in response to detecting, during the power up, the block-swap-ongoing pattern; and
erase the block that becomes the block having the active status in response to determining that the power loss occurred.

20. A method, comprising:
counting events with a volatile counter by incrementing a count of the volatile counter in response to each event;
writing a respective count-milestone record to a non-volatile memory array each respective time the count is incremented by a particular number of times; and
determining a respective initialization count of the counter at each respective power up of the counter to be the particular number of times multiplied by a number of count-milestone records written to the non-volatile memory up to the respective power up.

21. The method of claim 20, wherein writing the respective count-milestone record to the non-volatile memory array each respective time the count is incremented by the particular number of times comprises transforming a count-milestone-start sequence previously written to the non-volatile memory array to the respective count-milestone record.

22. The method of claim 21, wherein
the count-milestone-start sequence comprises first and second data values; and
transforming the count-milestone-start sequence to the respective count-milestone record comprises writing additional first data values to the count-milestone-start sequence to transform the second data values to the first data values.

23. The method of claim 21, wherein the count-milestone-start sequence is written to the non-volatile memory array in response to a first event after a power up of the volatile counter.

24. The method of claim 20, further comprising:
writing a count-milestone-start sequence to the non-volatile memory array after writing the respective count-milestone record to a non-volatile memory array;
determining, during the respective power up, that a power loss occurred in response to determining that the non-volatile memory array has the count-milestone-start sequence;
replacing the count-milestone-start sequence with an additional count-milestone record; and
writing an additional count-milestone-start sequence to the non-volatile memory array after writing the additional count-milestone record.

25. The method of claim 20, further comprising locating a pointer active sequence in the non-volatile memory array, wherein writing the respective count-milestone record to the non-volatile memory array comprises writing the respective count-milestone record to a page of the non-volatile memory pointed to by a pointer corresponding to the pointer active sequence.

26. The method of claim 25, further comprising:
programming the pointer active sequence to a pointer end sequence in response to the page becoming filled with count-milestone records;
writing an additional pointer active sequence in the non-volatile memory array that points to an additional page in the non-volatile memory array; and
writing an additional count-milestone record to the additional page in response to the count being incremented by the particular number of times.

* * * * *